July 23, 1957  E. A. MANNING  2,800,346
HAND ACTUATED TOGGLE

Filed Dec. 29, 1955  2 Sheets-Sheet 1

Inventor
ERNEST A. MANNING
By: Maybee & Legris
Att'ys

July 23, 1957     E. A. MANNING     2,800,346
HAND ACTUATED TOGGLE
Filed Dec. 29, 1955     2 Sheets-Sheet 2
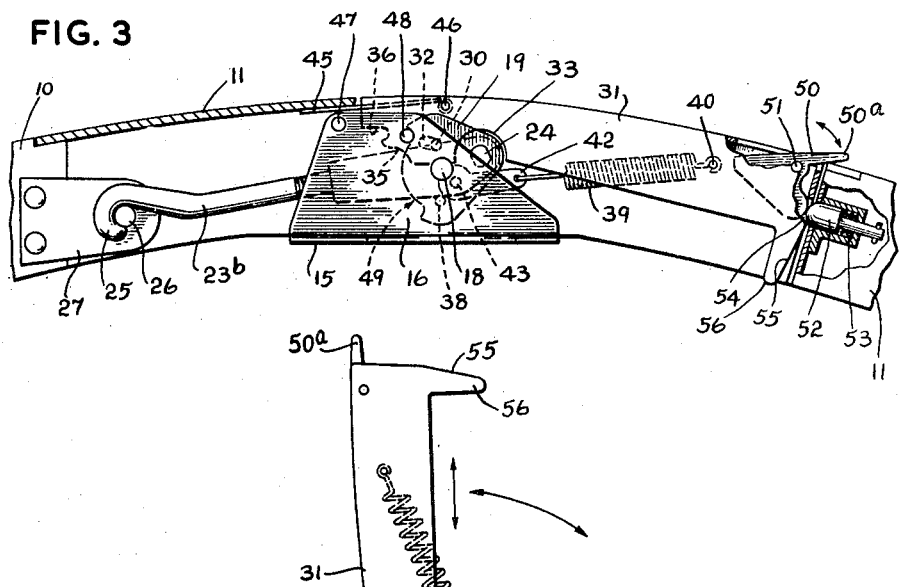
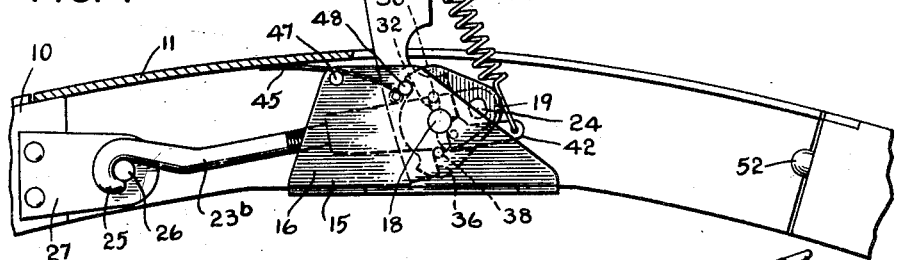
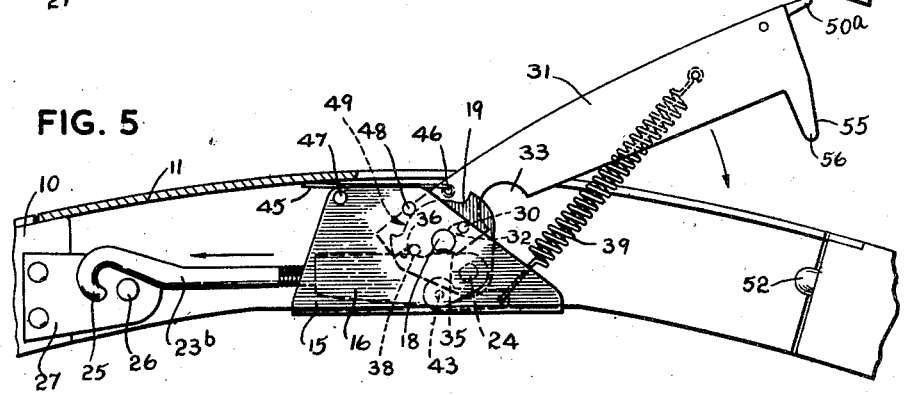
Inventor
ERNEST A. MANNING
By: Maybee & Legris
Att'ys

United States Patent Office 2,800,346
Patented July 23, 1957

2,800,346
HAND ACTUATED TOGGLE

Ernest Alan Manning, Toronto, Ontario, Canada, assignor to Avro Aircraft Limited, Malton, Ontario, Canada, a corporation Application December 29, 1955, Serial No. 556,129

3 Claims. (Cl. 292—113)

This invention relates to a toggle-actuated clamping mechanism which is of particular application where it is desired to secure a detachable panel in an aperture formed in the fuselage of an aircraft or other body, and the invention has particular application where it is desirable or essential for an actuating handle of the mechanism to form a continuation of a contour of the fuselage or body when the panel is correctly positioned within the aperture and the mechanism is in a clamping position.

By "toggle-actuated clamping mechanism" is meant a mechanism consisting essentially of two levers pivoted together at one of their ends, one of the levers being pivoted on a fixed member and the other lever being connected at its other end, either directly or indirectly, to a clamping mechanism, so that as the levers are moved for their ends to lie on a common straight line, the clamping mechanism is progressively tightened, after which the common pivot of the levers becomes "over-set" with respect to the other ends of the levers, which are then prevented from collapsing by engagement of at least one of the levers with a stop. To release or collapse the toggle, the common pivot is "under-set" by moving the levers in the opposite direction.

Such toggle-actuated clamping mechanisms have commonly been provided with an actuating handle which is an integral part of one of the levers, and, when the clamping mechanism is to be used for the purpose above-mentioned, it is usually arranged so that the actuating handle is flush with the surrounding surface when the mechanism is in a clamping or locked position. The disadvantage of the prior constructions is that the greatest amount of force is required at the beginning of the movement for collapsing or "under-setting" the toggle mechanism at which time the actuating handle is in its most inaccessible position, i. e., it is flush with the surface of the fuselage or body. It will be appreciated that this makes the mechanism difficult to operate, particularly when the operator has a gloved hand.

An object of the present invention is to provide a toggle-actuated closing mechanism in which the actuating handle can be disconnected from the toggle and moved to a stowed position in which it is flush with the surface of the fuselage or body without affecting the toggle.

A further object of the invention is to provide a toggle-actuated latching mechanism in which the actuating handle, when it is moved from its stowed position, is automatically connected to the toggle.

A still further object of the invention is to provide a toggle-actuated clamping mechanism in which the actuating handle can be connected to the toggle for the handle to extend substantially normal to the adjacent surface of the fuselage or the body or to a tangent thereof, when the toggle is in, or being moved towards, an over-set condition.

A still further object of the invention is to provide a toggle-actuated clamping mechanism in which the actuating handle thereof can be readily operated, even with a gloved hand.

In accordance with the invention, a toggle-actuated mechanism for clamping two adjacent structures together, includes a first stationary member associated with one of said structures, a first lever pivotally mounted on said stationary member, a second lever pivotally connected to said first lever remote from said pivotal mounting, a second stationary member fast with said other structure, means associated with the second lever and for engagement with said second stationary member for effecting the clamping, an actuating handle pivotally mounted on said first lever for movement angularly of said pivotal mounting and for limited movement in a direction longitudinally of said handle, means drivingly connecting said actuating handle to said first lever when said handle is moved in one direction longitudinally of said handle, and means associated with said first stationary member for limiting the movement of said levers in a direction in which said levers are overset.

Further objects and advantages of the invention will be appreciated from study of the following description when read in conjunction with the accompanying drawings.

In the drawings like reference numerals refer to like parts in the various views of which:

Figures 3, 4 and 5 are side elevations of the toggle-actuated clamping mechanism according to the invention, showing the mechanism in three different positions.

Figure 1:
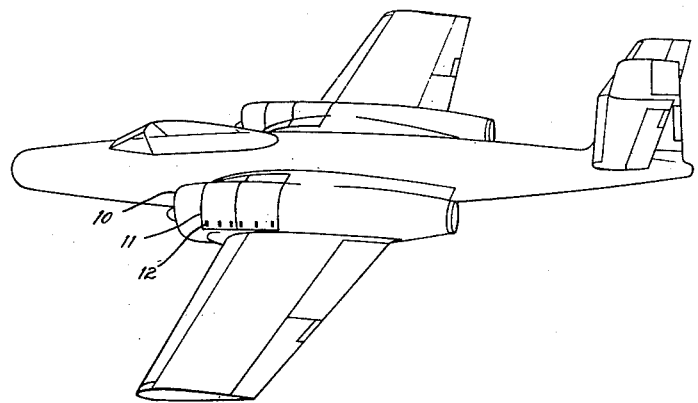
Figure 1 is a perspective view of an aircraft, and shows panels which are secured in the fuselage by means of the toggle-actuated clamping mechanism of the invention.

Referring firstly to Figure 1, a panel closing an aperture in the nacelle 10 is shown at 11, the panel 11 being secured in position by means of toggle-actuated clamping mechanisms 12 which are hereinbelow described in detail.

Figure 2:
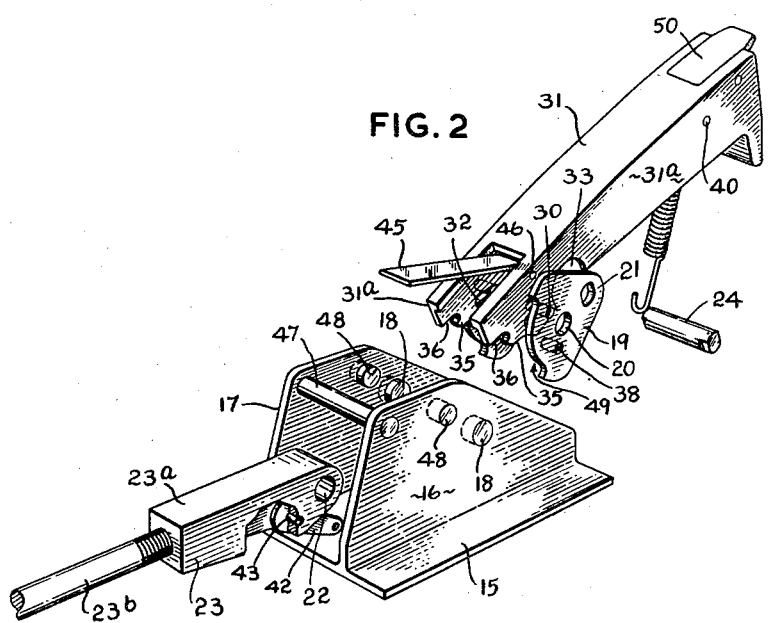
Figure 2 is an exploded perspective view of the mechanism shown in Figures 3, 4 and 5.

Referring now more particularly to Figures 2 and 3, the toggle-actuated clamping mechanism includes a stationary member 15 which is secured to the inner surface of the panel in any convenient manner so that lugs 16, 17 of the member are presented towards the panel. Each of the lugs 16, 17 supports a trunnion 18 on each of which a lever in the form of a plate 19 is journalled, the plate 19 being the "first lever" hereinafter referred to. The trunnions 18 pass into apertures 20 of the plates 19, the trunnions being secured to the lugs 16 and 17 in any convenient manner.

The plates 19 have aligned apertures 21, only one of which can be seen in the drawings, and through the aperture 21 and a bore 22 in the end of a lever 23, hereinafter referred to as a "second lever," is passed a pin 24, the pin pivotally connecting the lever 23 to the plates. The lever 23 includes a block 23a and a rod 23b which is provided at its end remote from the block 23a with a hook 25 which can be engaged over a pin 26 forming part of a stirrup 27 fast with the nacelle 10 of the aircraft.

Extending inwardly from each plate 19 is a pin 30 on which an actuating handle 31 is journalled, each pin extending through an elongated slot 32 formed in each of the side walls 31a of the handle and extending longitudinally of the handle. The handle 31 is conveniently of channel section, and is recessed at 33 in order that the side walls of the handle may clear the pin 24 when the handle is in a stowed position. At its end which is nearest to the pins 30, the actuating handle 31 has a cam surface 35 formed on the edges of each of its side walls, the cam surfaces leading into notches 36.

The cams are arranged so that, when the handle is moved for the pins 30 to be at the end of the slots 32 adjacent the cams 35, a stud 38 carried by each of the plates 19 can enter into the mouth of the notch 36, the handle then being moved by a spring 39 for the studs 38 to be fully engaged in the slots. The spring 39 is supported at one of its ends by a pin 40 which extends between and passes through the side walls of the handle, the other end of the spring being anchored to a plate 42 which is pivotally mounted on a pin 43 in a slot formed in block 23a.

The actuating handle is bifurcated at its end adjacent the levers, and a leaf spring 45 is pivoted on a pin 46 extending between the sides of the handle, the spring 45 extending over a pillar 47 extending between the lugs 16 and 17 and under the outer skin of the panel 11.

The lugs 16 and 17 also carry projections 48 which engage in an arcuate recess 49 formed in each of the plates 19 opposite the apertures 21. The purpose of the projections 48 is to limit the total angular movement of the plates 19 about the trunnions 18.

At its end remote from the levers, the handle is provided with a latch 50 which is pivoted on a pin 51 extending between the side walls of the handle, the latch when depressed, engaging the nose of a plunger 52 mounted in the panel 11 and biased by a spring 53 for its nose to engage in a recess 54 formed in the end of the handle. The handle has a cam surface 55 formed on an extension 56 at the end of the handle for retracting the plunger 52 as the handle is moved into its stowed position, the plunger then being moved into the recess 54 by the spring 53 for locking the handle in its stowed position.

The method of operating the toggle-actuated clamping mechanism is as follows:

With the parts in the position shown in Figure 3, the latch 50 is depressed so that its end 54 retracts the plunger 52 into the panel 11. This frees the handle so that it can be moved in an anti-clockwise direction to the position shown in Figure 4, the latch 50 being provided with an extension 50a which can easily be gripped by a gloved hand for effecting the initial movement. During this movement the handle pivots about the pins 30, the spring 39 biasing the handle so that the pins 30 are at the end of the slots 32 adjacent the latch 50, and the handle pivots about the pins 30 until such time as the cam surfaces 35 come into contact with the studs 38. When the cams 35 contact the studs 38 and the handle is moved still further in an anti-clockwise direction, the cams ride up the studs 38 to move the handle against the bias of the spring 39 for the outer ends of the slots 32 to be adjacent the pin 30, after which the cams 35 ride over the top of the studs 38 and the handle is moved by the spring 39 for the notches 36 to engage over the studs 38.

The handle is then in the position shown in Figure 4, in which it is rigidly connected to the plates 19, the spring 39 biasing the handle to prevent accidental disengagement of the notches 36 from the studs 38. It will be observed that during this movement, no movement has been imparted to either the plate 19 or the lever 23, and that the leaf spring 45 has moved with the handle and has become deflected but is in a position in which it still screens the opening.

The handle is then moved in a clockwise direction, as indicated in Figure 5, the handle during this movement moving the plates 19 in a clockwise direction by virtue of the fact that it is rigidly attached thereto. This movement moves the pin 24 over centre with respect to the trunnions 18 and results in the lever 23 being moved in a longitudinal direction for its hooked end to disengage from the pin 26. At the end of this movement the clamping mechanism is in an inoperative position and the panel can be removed from the fuselage.

It will be observed that at the beginning of the above-described clockwise movement, the handle 31 is extending in a direction in which it is substantially normal to a tangent of the surface of the panel. Thus, the operator has little difficulty in operating the handle, even with a gloved hand, and he can apply the force required to "under-set" the toggle with comparative ease, the handle at that time being in its most accessible position.

When it is desired to clamp the panel into position again in the aperture of the fuselage, the panel is offered up with the handle in the position shown in Figure 5, the spring 39 biasing the lever 23 so that it abuts the pin 26. The handle is then moved in an anti-clockwise direction to move the pin 24 over the centre with respect to the trunnion 18, the angular movement of the plates 19 being limited in both directions by the engagement of the projections 48 with the ends of the recesses 49.

The handle is then moved longitudinally by the operator, who can engage his fingers behind the extension 56, for the slots 36 to be withdrawn from the studs 38 to disconnect the handle from the plates 19, after which the handle is moved in a clockwise direction for its cam surface 55 to engage the nose of the plunger 52. The plunger is retracted into the panel 11 by the cam surface 55 until it is aligned with the recess 54 after which it is moved by the spring 53 to lock the handle in its stowed position. It will be observed that during this movement no movement has been imparted to either the plates 19 or the lever 23.

From the foregoing description it will be seen that a toggle-actuated clamping mechanism has been provided which enables the actuating handle to be moved to an operative or inoperative position independently of the toggle mechanism, the actuating handle when in its operative position being easily grasped by an operator who can then exert the force for under or over-setting the toggle mechanism while the handle is in its most convenient position.

While the device which has been described in detail may be considered to be a preferred embodiment, it has been described and illustrated as an example only and modifications may be made in the construction thereof without departing from the spirit of the invention or the scope of the appended claims.

What I claim as my invention is:

1. In a toggle-actuated clamping mechanism including a first stationary member, a first lever pivotally mounted on said stationary member, a second lever pivotally connected to said first lever remote from said pivotal mounting, a second stationary member and means associated with said second lever for engagement with said second stationary member for effecting said clamping between the stationary members; an actuating handle pivotally mounted on said first lever for movement angularly of said pivotal mounting independently of the first lever and for limited movement in a direction longitudinally of said handle, a pin carried by said first lever for engagement in an open-ended notch formed in said handle remote from the pivotal mounting of said handle whereby said handle can be drivingly connected to said first lever by moving said handle relative to said first lever in a direction for said notch to engage said pin and a projection associated with said first stationary member for limiting the movement of said levers in a direction in which said toggle is overset.

2. In a toggle-actuated clamping mechanism including a first stationary member, a first lever pivotally mounted on said stationary member, a second lever pivotally connected to said first lever remote from said pivotal mounting, a second stationary member and means associated with said second lever for engagement with said second stationary member for effecting said clamping between the stationary members; an actuating handle pivotally mounted on said first lever for movement angularly of said pivotal mounting independently of said first lever and for limited movement in a direction longitudinally of said handle, a pin carried by said first lever for engagement in an open-ended notch formed in said handle remote from the pivotal mounting of said handle whereby said handle can be drivingly connected to said first lever for said handle to extend in a direction which is substantially normal to the surface of said one structure by moving said handle relative to the first lever in a direction for said projection to enter into said slot, and means associated with said first stationary member for limiting movement of said lever in a direction in which said toggle is overset.

3. In a toggle-actuated clamping mechanism including a first stationary member, a first lever pivotally mounted on said structural member, a second lever pivotally connected to said first lever remote from said pivotal mounting, a second stationary member and means associated with said second lever for engagement with said second stationary member for effecting said clamping between the stationary members; an actuating handle pivotally mounted on said first lever for movement angularly of said pivotal mounting independently of the first lever and for limited movement in a direction longitudinally of said handle, a tension spring acting between said actuating handle and an anchorage associated with said second lever, said spring biasing said actuating handle for its end remote from said levers to be biased towards said levers, a pin carried by said first lever, a cam surface on said actuating handle, the said cam forming with said actuating handle an open-ended notch in which said pin can be engaged by moving the actuating handle relative to the first lever, said cam surface when engaging said pin moving said actuating handle against the bias of said spring to allow the said notch to engage over said pin for drivingly connecting said actuating handle to said first lever, and a projection associated with said first stationary member and engaged in a recess in said first lever, said projection limiting the movement of said levers in the direction in which said toggle is overset.

References Cited in the file of this patent

UNITED STATES PATENTS

| | | |
|---|---|---|
| 2,712,955 | Andrews | July 12, 1955 |
| 2,732,238 | Dornberg | Jan. 24, 1956 |

FOREIGN PATENTS

| | | |
|---|---|---|
| 142,725 | Australia | Aug. 6, 1951 |